Jan. 16, 1968          R. S. ZEBARTH ET AL          3,363,638
                HEAT EXCHANGER FOR POULTRY AND THE LIKE
                        Filed July 23, 1965
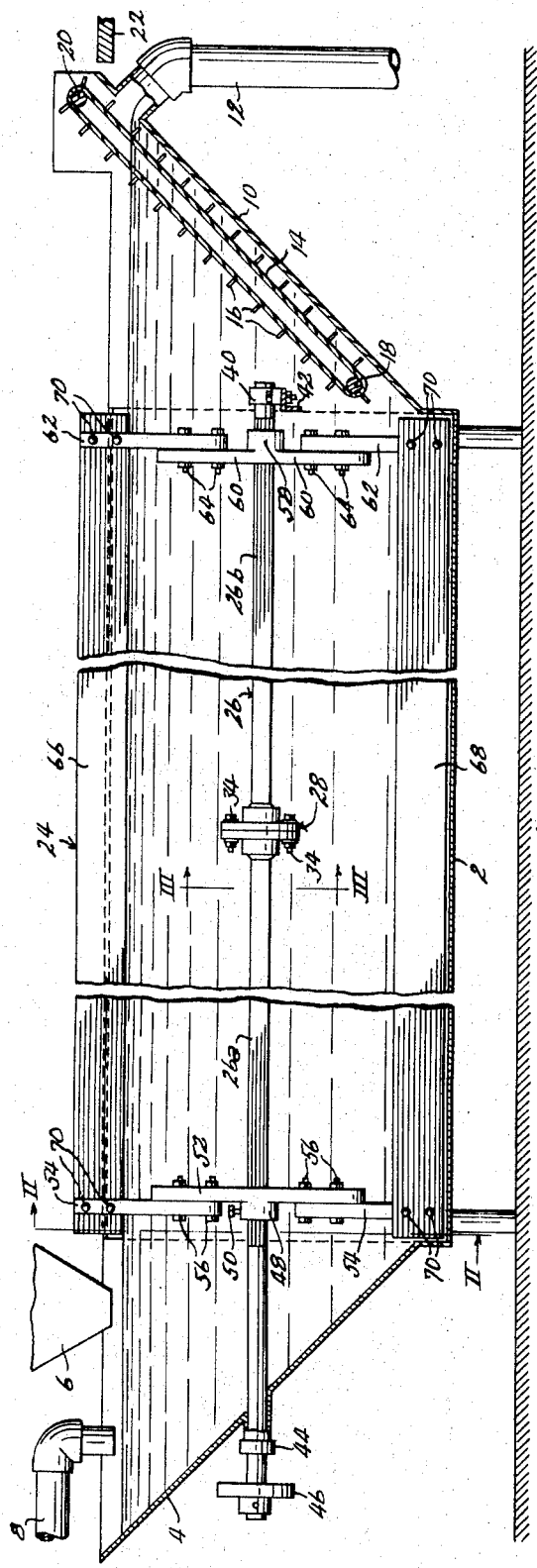
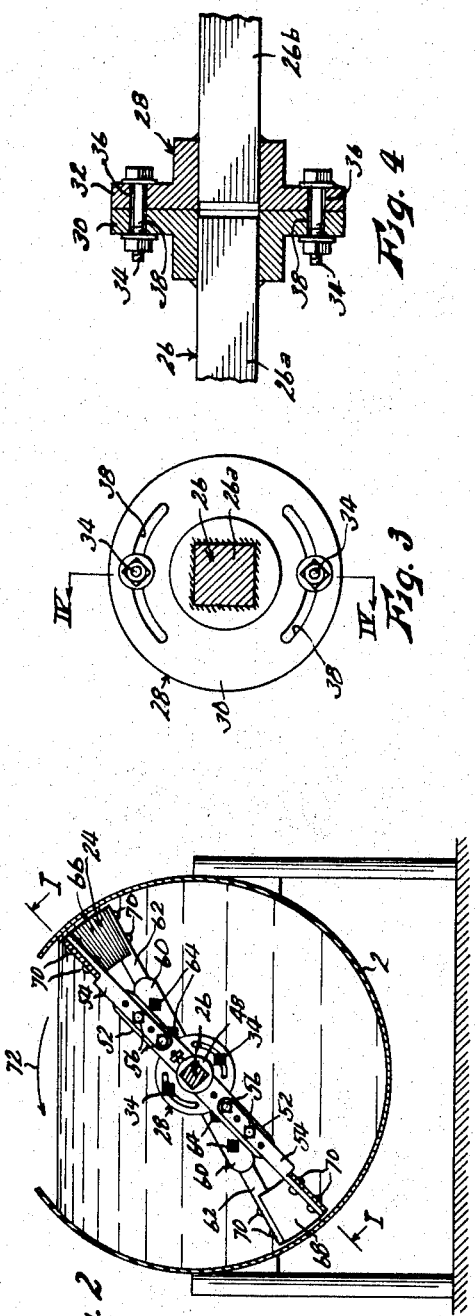
INVENTORS.
Ralph S. Zebarth
Jack A. Furlong
BY John A. Hamilton
        Attorney.

United States Patent Office 3,363,638
Patented Jan. 16, 1968

3,363,638
HEAT EXCHANGER FOR POULTRY AND THE LIKE
Ralph S. Zebarth, Kansas City, and Jack A. Furlong, Raytown, Mo., assignors to Ralph Zebarth, Inc., Kansas City, Mo., a corporation of Missouri
Filed July 23, 1965, Ser. No. 474,305
13 Claims. (Cl. 134—126)

ABSTRACT OF THE DISCLOSURE

Apparatus for heating or chilling poultry carcasses or parts thereof consisting of liquid bath of the desired temperature to which liquid is added and from which liquid is overflowed to create a current in the bath for propelling the carcasses or parts from an inlet station to an outlet station of the bath, and an agitator device movably positioned in the bath and operable both to agitate the carcasses or parts in the bath to insure efficient heat transfer, and also to deliver mechanical impulses to the carcasses or parts selectively either to impede or assist in the movement thereof through the bath.

---

This invention relates to new and useful improvements in poultry processing equipment, and has particular reference to a device for either chilling or heating poultry carcasses or parts thereof. Freshly dressed poultry carcasses or parts thereof require chilling to remove body heat therefrom preparatory to freezing, packaging or otherwise further processing them for sale. On the other hand, dressed poultry is often frozen for storage, then later further processed as for example deboning, grinding or the like and of course must be heated and thawed before this processing is performed. The present device has been developed and designed particularly for use in treating poultry giblets, namely hearts, livers and gizzards, and will be so described, although it will be readily apparent that with minor adaptations as to size and capacity the device could be utilized for treating while poultry carcasses and the like.

A popular type of poultry heat exchanger in very common usage includes a horizontally elongated tank containing a bath of water or other liquid of the desired temperature, the giblets to be treated being inserted into the bath at one end of the tank and removed at the other end after passing through the bath. The bath is agitated to insure thorough and intimate contact between the giblets and the water, and the giblets are caused to travel the length of the tank by a current set up therein by adding fresh water continuously at the inlet end of the tank and overflowing it at the outlet end of the tank.

However, certain problems have arisen in connection with this type of device. Governmental regulations require the overflowing of, and hence the addition of, additive water at at least a minimum rate depending on the rate at which giblets are added, in order to avoid contamination of the bath by poultry blood and other body fluids. Also, poultry parts can be immersed in the bath for only a limited length of time in order to maintain the percentage of water absorption thereby below an allowable rate, also established by governmental regulations. For a given or average rate of adding giblets to the bath, it will thus be clear that the length and flow area of the tank may be computed and designed so that addition of fresh water thereto at the required rate will establish a current which will transport the giblets through the tank within a time period long enough to provide the desired degree of temperature change, but short enough to avoid undue water absorption by the giblets. But the device will not then function efficiently or greater-than-average or less-than-average loading rates. On less-than-average loading rates, it is not economically feasible to maintain the addition of fresh water at the average load-rate, but if the water-addition rate is reduced to the rate actually required for the smaller load, the current in the tank will be slowed and the giblets will therefore remain in the tank too long and very possibly absorb more than the permissible amount of water. On the other hand, for greater-than-average loading rates the increased rate of adding fresh water will speed the water current in the tank, with the result that the giblets may be retained in the tank for too short a time to insure the desired degree of temperature change thereof.

Accordingly, the principal object of the present invention is the provision of a giblet heat exchanger of the character described having means for regulating the rate of travel of giblets through the tank, and hence the length of time they remain in the tank, independently of the water current established in the tank by the addition thereto, and overflow therefrom, of fresh water, even though still relying on said current for general motive power for moving said giblets through the tank. Thus the travel of the giblets is impeded during periods of greater-than-average rates of addition of giblets and fresh water, and is assisted or speeded during periods of less-than-average rates of addition of giblets and fresh water, to the end that the time the giblets remain in the tank may be equalized at all rates of addition of giblets and fresh water. Generally, this object is accomplished by means within the bath operable to deliver physical or mechanical impulses to the giblets which selectively impede, assist or do not affect the travel of the giblets as caused by water current in the bath.

Another object is the provision of a giblet heat exchanger of the character described wherein the selective impedance or assistance to giblet travel in the bath is provided by an agitator reel disposed longitudinally and rotatably in the tank and having longitudinal vanes operable to contact and abut giblets within the bath as the reel is rotated, said reel being adjustable to impart either a forward or reverse helical twist to said vanes and in adjustably variable degrees. These vanes, while rotating in the water, cannot materially affect the rate of travel of the water itself, since this is determined by the rate of addition and overflow of the water, but do deliver mechanical impulses to the giblets, said impulses being either forward or rearward with respect to the direction of water travel depending on the setting of the vanes, so that the effective rate of travel of the giblets may be made either faster or slower than the rate of water travel, as desired.

Still another object is the provision of a giblet heat exchanger of the character described wherein the agitator reel has the additional function of insuring that the giblets are retained in suspension in the water during most of their travel through the tank, in order that they may effectively be propelled by the flow of water in the bath. Giblets as well as poultry carcasses in general, are slightly nonbuoyant so that they tend to settle to the bottom of the tank and lodge there. Within practical limits even a very swift current could not insure travel of the giblets through the tank, said giblets on the contrary would tend to settle into a stationary mass on the bottom of the tank. The present agitator mechanically elevates giblets which have settled to the tank bottom to the top of the tank, then releases them to settle slowly through the bath, so that they can effectively be propelled even by weak water currents.

Other objects are simplicity and economy of construction, efficiency and dependability of operation, and adaptability for use in chilling or heating many types of articles other than poultry or poultry giblets.

With these objects in view, as well as other objects which will appear in the course of the specification, reference will be had to the accompanying drawing wherein:

FIG. 1 is a foreshortened vertical midsectional view of a heat exchanger embodying the present invention, foreshortened and with parts left in elevation and partially broken away, being essentially a sectional view taken on line I—I of FIG. 2 but with the vanes rotated to a vertical position and left untwisted, FIG. 2 is a sectional view taken on line II—II of FIG. 1 with the reel adjusted to twist the vanes into helical form, FIG. 3 is an enlarged, fragmentary sectional view taken on line III—III of FIG. 1, and FIG. 4 is a fragmentary sectional view taken on line IV—IV of FIG. 3, with parts left in elevation.

Like reference numerals apply to similar parts throughout the several views, and the numeral 2 applies to the tank for containing the heat treating bath, the main central portion of said tank being a cylindrical cross-sectional contour, open at the top, and of any desired length. It is provided at one end with an entry section 4 into which poultry parts or other articles to be treated are dropped from a hopper 6, and into which additive or make-up liquid is added constantly through a pipe 8. If the articles to be treated are poultry carcasses, giblets, or other parts, the liquid is water, either hot or cold depending on whether it is desired to heat or chill said articles. In the case of a chilling operation, the make-up additive may be a mixture of water and cracked ice. As has been mentioned previously, government regulations require the addition of make-up water at a rate determined by the rate which poultry parts are added, say a minimum of one gallon of water for each 100 sets of chicken giblets, in order to avoid harmful contamination of the bath by blood, body fluids and the like. It is of course not economical to add water at a rate greater than is actually required for purity.

The tank is provided at its opposite end with an exit section 10 fitted with an overflow pipe 12 through which water will overflow at the same rate it is added from pipe 8, the elevation of the overflow thus determining the depth of the water bath in tank 2. The exit section is also provided with a conveyor consisting of a flexible belt 14 having cleats 16 thereon and trained over a pair of rollers 18 and 20 carried rotatably by the tank, at least one of said rollers being rotatably driven by any suitable means, not shown. Said belt is so inclined as to receive articles on the lower portion thereof, and to elevate them above the liquid level of the tank and deposit them on a table 22, or on another conveyor to transport them to another station for further processing. It will be apparent that from the structure thus far described, the addition of water from pipe 8, and its overflow at pipe 12, a water current will be established flowing from the inlet end of the tank to its outlet end, and that this current will carry articles deposited in the bath longitudinally through the tank, as long as said articles are maintained in suspension in the bath, as will be described.

Disposed coaxially within tank 2, and extending substantially the entire length of the cylindrical portion thereof, is a reel designated generally by the numeral 24. Said reel is mounted on a shaft 26 disposed coaxially in the tank, and is divided intermediate its ends into two sections 26a and 26b, the contiguous ends of said shaft sections being joined by a coupling 28. As best shown in FIGS. 3 and 4, said coupling consists of a pair of flanges 30 and 32 welded respectively to the two shaft sections, said flanges abutting each other rotatably in a plane at right angles to the shaft, and being joined by a pair of bolts 34 extending therethrough parallel to the shaft axis. Said bolts pass through holes 36 formed in flange 32, and through slots 38 formed in flange 30, said slots being arcuately elongated concentrically with the shaft. Thus by loosening bolts 34 the two sections 26a and 26b of the shaft may be rotated relative to each other about the shaft axis to any angular position desired, and secured at that adjustment by tightening the bolts. The shaft is shown as square except at its ends, one end being journalled in a bearing 40 mounted on a cross bar 42 extending across the outlet portion of the tank, and the other end being rotatably mounted in a bearing-stuffing box element 44 at the inlet end of the tank, extending outwardly from the tank and having a pulley 46 or the like at its outer end whereby it may be connected to and rotatably driven by any suitable power element, not shown.

Mounted non-rotatably on shaft section 26a, adjacent the inlet end of the tank, is a hub 48, said hub being secured against sliding movement along the shaft by set screw 50. Formed integrally with said hub are a pair of oppositely extending radial arms 52, and to each of said arms an arm extension 54 is affixed by a pair of bolts 56, said bolts being inserted selectively through various longitudinally spaced holes in said arms and arm extensions whereby to adjustably vary the combined radial extension of the arms and arm extensions. Similarly, a hub 58 having arms 60, and arm extensions 62 secured to said arms by bolts 64, is mounted on shaft section 26b adjacent the outlet end of the tank. However, hub 58 is freely slidable along the shaft, though secured against rotation thereon. Finally, the device includes a pair of vanes 66 and 68 each consisting of a flat strip of aluminum or other resilient material extending the full length of reel 24 to points closely adjacent the ends of the cylindrical portion of the tank. Said vanes are generally parallel to shaft 26, and each is secured at its respective ends, as by rivets 70, to the outer ends of a corresponding pair of arm extensions 54 and 62. As will be seen in FIG. 2, the leading faces of the vanes, as the reel is rotated in the direction of arrow 72, are radial to the reel axis.

The reel 24 actually has two principal functions, first as an agitator which maintains the articles in suspension in the bath in order that they will be efficiently propelled by the water current therein, and second as a means for causing said articles to travel in the bath at rates selectively either faster or slower than the water current, as may be desired. In the function of the reel as an agitator, it should be understood that poultry giblets, carcasses and the like are slightly non-buoyant in water, so as to sink slowly when deposited therein. In the present device, the poultry parts sinking to the bottom of the tank are immediately contacted by one of the vanes and elevated thereby along the side of the tank. The parts should of course not slip between the tank wall and the vanes, and for this reason the vane arms are made adjustable in length to accommodate parts of different sizes. For example, with giblets, which may be very small, the vanes must move in very close proximity to the tank wall, while for whole carcasses the spacing may be much wider. As each vane nears the top of its orbit, carrying its load of poultry parts, said parts fall away from the vane by gravity. In order to insure that the parts actually will fall away from the vanes, and not remain pressed thereagainst by water pressure caused by rotation of the reel, the water level is positioned at such an elevation that all, or at least a major portion, of each vane is elevated above said water level at the top of its orbit, so that all water pressure on the poultry parts carried by said vane is released and said parts must fall free. Were it not for this feature, and if the reel were completely submerged, poultry parts might be held against the vanes by the water pressure for an indefinitely long period of time, perhaps for many revolutions of the reel. As the poultry parts are released, they are of course suspended in the bath, and settle slowly therethrough to the bottom of the tank, where they are again picked up by a vane and started again through another like cycle. The suspension of the parts in the water insures a thorough, intimate, and constantly changing contact between said parts and said water, in order to insure a highly efficient heat exchanging function. Said suspension of the parts in the water insures also that the parts will be effectively propelled longitudinally through the tank by the current generated by the addition and overflow of make-up water as previously described, even though under some circumstances this current may be slow and gentle. As a matter of fact, it has been found that without some means for maintaining the poultry parts in suspension, even a very swift water current will not insure travel of the parts through the tank. On the contrary, said parts would then have a pronounced tendency to settle to the bottom of the tank into a solid, stationary mass. The present device, moreover, provides the suspension by a process of repetitive lifting and dropping, rather than by any process of relatively violent general stirring or agitation. This is an important feature also, since it permits a very slow, gentle agitation which will not bruise, skin or otherwise damage the poultry parts. Purely by way of example only, it has been found that in a tank of about four feet in diameter, a reel speed of about three or four revolutions per minute provides quite satisfactory results.

To understand the reel in its second function as a means for varying the rate of travel of the poultry parts through the tank, it should first be appreciated that in any case the parts should remain in the bath for a substantially fixed length of time, long enough to provide the desired degree of cooling, or heating as the case may be, but still short enough to hold the water absorption by the parts below allowable limits. It will be apparent that for any given rate, and for the corresponding rate of adding make-up water from pipe 8, also established by regulations, the tank area and length could be designed so that the poultry parts would remain in the tank for the proper length of time, being propelled solely by the water current generated by the addition and overflow of water. However, if job conditions called for a greater loading rate, and consequently a higher rate of addition of water from pipe 8, the swifter current in the tank would move the parts through the tank in a shorter time, and the parts therefore would not be cooled, or heated, to the desired degree. If job conditions called for a less-than-average rate of insertion of poultry parts from hopper 6, and consequently a lower rate of addition of water from pipe 8, the resulting slower water current in the tank would retain the poultry parts therein for too long a time, so that they would absorb more than the allowable amount of moisture.

The present structure solves these difficulties in a novel manner. As previously described, bolts 34 of coupling 28 of shaft 26 may be loosened and shaft sections 26a and 26b rotated relatively about the shaft axis, whereby to impart a helical twist to the reel vanes 66 and 68. Thus as said vanes impinge against and move the poultry parts in the bath, and again as said parts drop from said vanes, said vanes impart a forward or rearward mechanical impulse to the poultry parts, depending on the direction of helical twist of the vanes. The vanes may be left straight as in FIG. 1, with no helical twist, in which they do not materially affect the rate of travel of poultry parts through the bath. This is the reel adjustment for the "average" or design loading rate described above. The vanes may be adjusted to a helical twist such that their leading faces are inclined forwardly or toward the outlet end of the tank, as illustrated in FIG. 2, so that they deliver mechanical impulses to the poultry parts tending to urge said parts toward said outlet end of the tank at a speed faster than the actual water current rate in the tank. This adjustment would be used for low or "less-than-average" loading rates. The vanes may also be adjusted to a reverse helical twist in which their leading faces are inclined rearwardly toward the inlet end 4 of the tank, so that they deliver mechanical impulses to the poultry parts tending to slow the rate of travel of said parts through the bath to a speed less than the water current speed. This adjustment would be used for high or "greater-than-average" loading rates. For either forward or reverse helical twisting of the vanes, the magnitude of the forward or rearward mechanical impulses delivered thereby to the poultry parts may be adjusted by varying the degree of helical twist, a greater or less degree of twist causing the component of the impulse longitudinal to the tank to be correspondingly greater or less. If the adjustments are properly made, the poultry parts will remain in the tank for approximately the same length of time, long enough to produce the desired temperature change but short enough to prevent undue absorption of water, regardless of widely varying rates of adding fresh water from pipe 8, and hence regardless of widely varying water current speeds in the tank, even though still relying on said current for motive power to propel said parts through the tank. It should be borne in mind that the reel controls the rate of travel of the poultry parts by direct mechanical or physical action thereon, forcing them to travel at overall rates of speed either faster or slower, as the case may be, than the speed at which they would travel if affected by water current alone, and not by changing the current speed itself. The current speed itself is determined solely by the rate of water addition at pipe 8 and overflow at pipe 12, and cannot be materially affected by the reel. The reel, if helically twisted, does have a tendency to urge the water forwardly or rearwardly, but cannot do so because the current is controlled by the overflow rate. Hence the helical reel creates a turbulence which further increases the efficiency of the heat transfer operation.

While we have shown and described a specific embodiment of our invention, it is obvious that variations thereof fall within the purview of the invention. For example, the structure shown contemplates the use of a single-speed, unidirectional power drive to the reel, adjustment of the direction and magnitude of impulses delivered thereby being provided by adjusting the direction and degree of helical twist of the vanes. While this arrangement is believed to possess certain advantages of simplicity and economy, it would be possible to use a reel having vanes at a fixed degree of twist with a reversible, variable speed power drive, the reversibility of drive providing for reversing the direction of impulses delivered thereby, and the variability of drive speed providing for variation of the magnitude of the impulses. It is considered readily apparent that these as well as many other minor changes of structure and operation could be made without departing from the spirit of the invention as defined by the scope of the appended claims.

What we claim as new and desire to protect by Letters Patent is:

1. An article heat exchanger comprising:
 (a) a horizontally elongated tank having an inlet end and an outlet end, and adapted to contain a bath of liquid at a temperature different from that of the articles to be treated,
 (b) means for inserting articles to be treated and additive liquid in a predetermined ratio, at the inlet end of said tank, said tank having an overflow opening at the outlet end thereof whereby the depth of liquid in said tank is determined, the addition of liquid at the inlet end of said tank establishing a current in said bath to propel said articles from the inlet end to the outlet end of said tank,
 (c) means for removing said articles from said tank at the outlet end thereof,
 (d) agitator means disposed within said tank and operable when driven to deliver periodical mechanical impulses to said articles within said bath by direct physical contact therebetween in a direction longitudinal to said tank, whereby to affect the rate of travel of said articles through said tank independently of the rate of current flow in said bath, said agitator means comprising a reel the axis of which is disposed longitudinally of said tank, and which includes a plurality of longitudinal vanes spaced apart from said axis, said vanes being formed helically about said reel axis, and (e) means for driving said agitator means.

2. A heat exchanger as recited in claim 1 wherein said agitator means is adjustable to deliver impulses selectively either forwardly toward the outlet end of said tank, or rearwardly toward the inlet end of said tank.

3. A heat exchanger as recited in claim 1 wherein said agitator means is adjustable to deliver impulses of variable magnitude.

4. A heat exchanger as recited in claim 1 wherein said agitator means is adjustable to deliver impulses of variable magnitude selectively either forwardly toward the outlet end of said tank, or rearwardly toward the inlet end of said tank.

5. A heat exchanger as recited in claim 1 wherein said vanes are formed of resiliently yieldable material, and wherein said reel is adjustable to vary the degree of helical twist in said vanes.

6. A heat exchanger as recited in claim 1 wherein said vanes are formed of resiliently yieldable material, and wherein said reel is adjustable to reverse the direction of helical twist of said vanes.

7. A heat exchanger as recited in claim 1 wherein said vanes are formed of resiliently yieldable material, and wherein said reel is adjustable to reverse the direction of helical twist of said vanes, and to vary the degree of said helical twist.

8. A heat exchanger as recited in claim 1 wherein said agitator means comprises:

(a) a shaft disposed axially in said tank and rotatable in one direction, said shaft being divided intermediate its ends into two sections, (b) a coupling joining the contiguous ends of said shaft sections and operable to permit relative angular rotative adjustment of said shaft sections, (c) a pair of hubs mounted non-rotatively respectively on said two shaft sections, (d) a plurality of arms affixed to and extending radially from each of said hubs, and (e) a plurality of vanes formed of flexible material extending parallel to said shaft, each vane being affixed at its ends to corresponding arms of said hubs, said vanes being formable by adjustment of said coupling to assume either a forward or reverse helical twist about said shaft, or to assume a straight form parallel to said shaft.

9. A heat exchanger as recited in claim 8 wherein one of said hubs is fixed against movement along its associated shaft section and the other of said hubs is free to move slidably along its associated shaft section but is secured against rotation thereon.

10. A heat exchanger as recited in claim 8 wherein said coupling is operable to permit continuous, stepless angular adjustment of said shaft sections, whereby the degree of helical twist of said vanes, as well as the direction thereof, may be adjusted.

11. A heat exchanger as recited in claim 8 having means whereby the radial length of the arms of said hubs may be adjusted.

12. A heat exchanger as recited in claim 1 wherein said tank is generally cylindrical in cross-sectional contour, the axis of said reel being coaxial therewith, the vanes of said reel moving in close proximity to the tank wall, whereby to engage and elevate articles which may have sunk to the bottom of the tank, the depth of liquid in the tank being such that each vane is elevated above the liquid level at the top of its orbit around said reel axis.

13. A heat exchanger as recited in claim 12 wherein the leading surface of each of said vanes, as said reel is rotated, is disposed substantially radially to the axis of said reel.

References Cited

UNITED STATES PATENTS

| 797,171 | 8/1905 | Cerruti | 134—126 |
| 2,238,690 | 4/1941 | Fell | 134—194 X |
| 2,698,742 | 1/1955 | McCoy | 259—9 X |
| 2,879,540 | 3/1959 | Van Ness | 134—194 X |

CHARLES A. WILLMUTH, *Primary Examiner.*

R. L. BLEUTGE, *Assistant Examiner.*